United States Patent Office 2,929,815
Patented Mar. 22, 1960

2,929,815

OXIDO STEROIDS

Meyer Sletzinger, North Plainfield, N.J., assignor to Merck & Co., Inc., Rahway, N.J., a corporation of New Jersey No Drawing. Application October 1, 1958
Serial No. 764,513

2 Claims. (Cl. 260—239.55)

This invention relates to new steroids of the pregnane series and to processes of preparing such compounds. More specifically, it relates to 6-substituted-16α-methylpregnanes and methods of preparing them. Still more specifically, it is concerned with 16α-methyl-17-20,20-21 bismethylenedioxy - 3 - ethylenedioxy - 5α,6α - oxido - allopregnane, and with the synthesis of this substance from 16α-methyl substance S.

According to my invention the novel steroid substance 16α - methyl - 17 - 20,20 - 21 bismethylenedioxy - 3 - ethylenedioxy-5α,6α-oxido-allopregnane is prepared from 16α - methyl - 4 - pregnen - 3,20 - dione - 17α,21 - diol (16α-methyl substance S) by the sequence of reactions shown below:

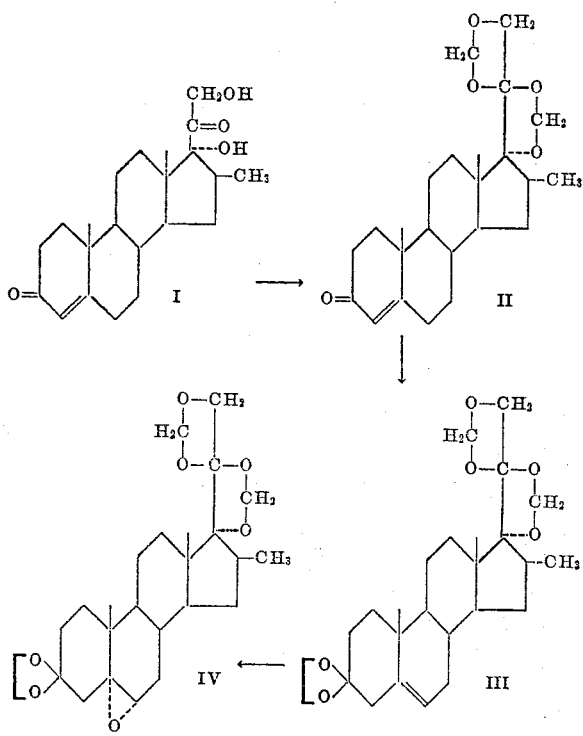

The end product of this invention, Compound IV hereinabove, is a useful intermediate in the synthesis of physiologically active steroids as discussed more fully hereinbelow.

According to the first step of my new process, 16α-methyl substance S is converted to a 16α-methyl-17-20, 20-21 bismethylenedioxy steroid of Formula II hereinabove by treatment with formaldehyde. This reaction is preferably carried out in a two-phase solvent system wherein the steroid is dissolved in an organic solvent such as chloroform and the formaldehyde is present primarily in aqueous phase containing a mineral acid, preferably hydrochloric acid. The strong acid is necessary to the success of the reaction. In the succeeding step, a 16α-methyl - 17 - 20,20 - 21 bismethylenedioxy - 3 - ethylenedioxy steroid is prepared by treating a compound of Formula II with ethylene glycol in the presence of an acid catalyst, preferably in the presence of a small amount of p-toluene sulfonic acid. Introduction of the 3-ethylenedioxy substituent is brought about in an organic solvent medium comprising an inert solvent such as benzene or toluene. The reaction is carried out for about 10–20 hours at the reflux temperature.

In the third and final step of my invention, a 5α,6α-oxido steroid of Formula IV hereinabove is obtained by reacting a Δ5-steroid of Formula III with a per-acid such as perbenzoic, peracetic or perthalic. Formation of the oxide is accomplished by intimately contacting the reactants in an inert solvent medium at about room temperature. When the reaction is complete, excess per-acid is decomposed by methods known in the art and the desired 16α - methyl - 17 - 20,20 - 21 bismethylenedioxy - 3 - ethylenedioxy-5α,6α-oxido-allopregnane recovered from the solvent by the usual methods.

The following examples are given for purposes of illustration and not by way of limitation:

EXAMPLE 1

*16α-methyl-17-20,20-21 bismethylenedioxy-4-pregnen-3-one*

Three grams of 16α-methyl-4-pregnen-17α,21-diol-3,20-dione are dissolved in 120 ml. of chloroform. To this solution is added a mixture of 30 ml. of concentrated hydrochloric acid and 30 cc. of 37% aqueous formaldehyde solution. The resulting mixture is stirred for about 60 hours at room temperature. The chloroform layer is then separated, washed with sodium bicarbonate solution until neutral, then with water, dried over anhydrous sodium sulfate, and finally evaporated to dryness in vacuo. The residual crude material is purified by crystallization from a 1:1 mixture of methylene chloride and methanol to give 16α-methyl-17-20,20-21 bismethylenedioxy-4-pregnen-3-one.

EXAMPLE 2

*16α-methyl-17-20,20-21 bismethylenedioxy-3-ethylenedioxy-5-pregnene*

One gram of 16α-methyl-17-20,20-21 bismethylenedioxy-4-pregnen-3-one is dissolved in 40 ml. of benzene. 2 ml. of ethylene glycol and 0.8 grams of p-toluene sulfonic acid are added and the resulting mixture refluxed for 16 hours. Water is continuously removed from the refluxing reaction mixture. The mixture is then cooled to 20° C., washed with three 10 ml. portions of water, 10 ml. of saturated sodium bicarbonate solution and again with 10 ml. of water. The benzene solution is separated, dried over magnesium sulfate and concentrated to dryness in vacuo. The solid is triturated with ether to give 16α-methyl - 17 - 20,20 - 21 - bismethylenedioxy - 3 - ethylenedioxy-5-pregnene which may be further purified by recrystallization from the acetonitrile.

EXAMPLE 3

*16α-methyl-17-20,20-21 bismethylenedioxy-3-ethylenedioxy-5α,6α-oxido-allopregnane*

One gram of 16α-methyl-17-20,20-21 bismethylenedioxy-3-ethylenedioxy-5-pregnene is added to 1.5 ml. of 0.39 molar perbenzoic acid in benzene with cooling to maintain the temperature of 20–25° C. The reaction mixture is held at 25° C. for 60 hours. At the end of this time it is treated with 15% sodium bisulfite solution and then with saturated sodium bicarbonate solution to remove any acid. The organic layer is separated and dried over sodium sulfate. It is then filtered and concentrated to dryness under reduced pressure. The residual solid is crystallized from methanol to give substantially pure 16α-methyl-17-20,20-21 bismethylenedioxy-3-ethylenedioxy-5α,6α-oxido-allopregnane.

The 16α-methyl-17-20,20-21 bismethylenedioxy-3-ethylenedioxy-5α,6α-oxido-allopregnane of this invention is useful as an important intermediate in synthesizing 6α,16α-dimethyl hydrocortisone, a substance which has an unusually high degree of cortisone-like anti-inflammatory activity and which is thus useful in the treatment of arthritis and various dermatoses.

16α-methyl-17-20,20-21 bismethylenedioxy-3-ethylenedioxy-5α,6α-oxido-allopregnane is converted to 6α,16α-dimethyl hydrocortisone by first reacting with methyl magnesium bromide in ether or benzene at about 50–70° C. for 5–6 hours to give 6β,16α-dimethyl-17-20,20-21 bismethylenedioxy-3-ethylenedioxy-allopregnan-5α-ol. This latter material is then treated with 8% sulfuric acid in methanol to produce 6β,16α-dimethyl-17-20,20-21 bismethylenedioxy-allopregnan-3-one-5α-ol which compound is contacted with methanolic potassium hydroxide at about 60° C. for one hour to produce 6α,16α-dimethyl-17-20, 20-21 bismethylenedioxy-4-pregnen-3-one. Heating this latter substance in 60% formic acid at about 90° C. for 15 minutes produces 6α,16α-dimethyl-4-pregnen-3,20-dione-17α,21-diol (6α,16α-dimethyl substance S).

6α,16α-dimethyl substance S is converted to physiologically active 6α,16α-dimethyl hydrocortisone by contacting it with a growing culture of an 11β-hydroxylating strain of the microorganism *Curvularia lunata*. This latter step, as well as the earlier steps in the process for converting the end product of this invention to 6α,16α-dimethyl hydrocortisone are discussed more fully and claimed in copending application of Sletzinger and Gaines, Serial No. 764,525, filed October 1, 1958.

16α-methyl substance S which is employed as the starting material in the process of this invention has been described in J.A.C.S. 80, 4431 (1958). Preparation of this material is also described in copending application Serial No. 754,181, filed August 11, 1958, now abandoned, and in the copending continuation-in-part application thereof.

Any departure from the above description which conforms to the present invention is intended to be included within the scope of the claims.

What is claimed is:

1. 16α-methyl-17-20,20-21 bismethylenedioxy-3-ethylenedioxy-5α,6α-oxido-allopregnane.

2. 16α-methyl-17-20,20-21 bismethylenedioxy-3-ethylenedioxy-5-pregnene.

References Cited in the file of this patent

UNITED STATES PATENTS

| | | |
|---|---|---|
| 2,742,461 | Bernstein et al. | Apr. 17, 1956 |
| 2,838,501 | Campbell et al. | June 10, 1958 |
| 2,838,502 | Beal et al. | June 10, 1958 |

OTHER REFERENCES

Beyler et al.: 80 J.A.C.S. 1517–18 (March 1958).